US011666877B2

(12) United States Patent
Lautenschläger et al.

(10) Patent No.: US 11,666,877 B2
(45) Date of Patent: Jun. 6, 2023

(54) PRESSURE VESSEL WITH FLUSHING DEVICE

(71) Applicant: MWT AG, Heerbrugg (CH)

(72) Inventors: Werner Lautenschläger, Auerstrasse (CH); Jens Lautenschläger, Heerbrugg (CH); Werner Scholze, Isny (DE)

(73) Assignee: MWT AG, Heerbrugg (CH)

( * ) Notice: Subject to any disclaimer, the term of this patent is extended or adjusted under 35 U.S.C. 154(b) by 260 days.

(21) Appl. No.: 16/528,829

(22) Filed: Aug. 1, 2019

(65) Prior Publication Data

US 2020/0038828 A1 Feb. 6, 2020

(30) Foreign Application Priority Data

Aug. 2, 2018 (DE) .................... 20 2018 104 456.7

(51) Int. Cl.
*B01J 3/02* (2006.01)
*B01J 3/04* (2006.01)
(Continued)

(52) U.S. Cl.
CPC . *B01J 3/04* (2013.01); *B01J 3/02* (2013.01); *B01J 19/002* (2013.01); *B01J 19/126* (2013.01);
(Continued)

(58) Field of Classification Search
None
See application file for complete search history.

(56) References Cited

U.S. PATENT DOCUMENTS

| 5,211,820 A | * | 5/1993 | Poor | C21D 1/76 |
| | | | | 204/424 |
| 2011/0226608 A1 | | 9/2011 | Lautenschläger | |
| 2015/0315694 A1 | * | 11/2015 | Zhang | C23C 10/14 |
| | | | | 427/250 |

FOREIGN PATENT DOCUMENTS

| DE | 10 2008 001 710 A1 | 11/2009 |
| DE | 10 2011 119 146 A1 | 5/2013 |

OTHER PUBLICATIONS

Machine translation of DE 10 2008 001 710 to Kroeger.
Machine translation of DE 10 2011 119 146 to Himmen.

* cited by examiner

*Primary Examiner* — Jennifer A Leung
(74) *Attorney, Agent, or Firm* — The H. T. Than Law Group (57) ABSTRACT

The invention relates to a pressure vessel, having: a reaction chamber (2) as a pressure space for the initiation and/or facilitation of chemical and/or physical pressure reactions of samples (P) accommodated in the reaction chamber (2); a fluid inlet (20) with a feed valve (21) which is adjustable between an open position, for the feed of a fluid, preferably a flushing gas, into the reaction chamber (2), and a closed position, for stopping the feed of the fluid; a fluid outlet (30) with a discharge valve (31), which is adjustable between an open position, for the discharge of a fluid out of the reaction chamber (2), and a closed position, for stopping the discharge of the fluid out of the reaction chamber (2); and an oxygen sensor (33) for detecting an oxygen content in the reaction chamber (2). The pressure vessel (1) furthermore has a control device which is configured to control the feed valve (21) and the discharge valve (31) on the basis of the oxygen content detected by the oxygen sensor (33), such that the reaction chamber (2) is flushed via the feed and dis- (Continued)

charge valves (21, 31) situated in the open position, and at least the discharge valve (31) switches from the open position into the closed position as soon as a predetermined oxygen content is undershot. The invention also relates to a corresponding method.

16 Claims, 5 Drawing Sheets

(51) Int. Cl.
     *B01J 19/14*      (2006.01)
     *B01J 19/12*      (2006.01)
     *B01J 19/00*      (2006.01)

(52) U.S. Cl.
     CPC ...... *B01J 19/14* (2013.01); *B01J 2219/00162* (2013.01); *B01J 2219/00182* (2013.01); *B01J 2219/1206* (2013.01)

PRESSURE VESSEL WITH FLUSHING DEVICE

FIELD OF THE INVENTION

The invention relates to a pressure vessel having a reaction chamber as a pressure space for the initiation and/or facilitation of chemical and/or physical pressure reactions of samples accommodated in the reaction chamber.

BACKGROUND OF THE INVENTION

It is known, prior to the start of a reaction—in particular in the case of synthesis or extraction—to flush the reaction chamber of a pressure vessel with an in particular inert or reductive gas in order to prevent destruction or decomposition or chemical change of the samples for testing. Such a change is generally caused because oxygen is present in the reaction chamber, wherein, in particular, high temperatures and/or pressures further accelerate this change. The flushing of the reaction chamber is thus intended to cause the oxygen to escape from the reaction chamber, such that no change to the samples for testing occurs. This is of importance in particular because changed samples falsify the analysis or the analysis results.

It has been shown in the prior art that, during the flushing, although oxygen escapes from the reaction chamber, a residual amount of oxygen nevertheless remains in the reaction chamber. There is consequently a demand for this residual amount to also be removed from the reaction chamber or at least reduced in order to make the flushing altogether more efficient.

SUMMARY OF THE INVENTION

It is thus an object of the invention to provide a pressure vessel of the type mentioned in the introduction which flushes the reaction chamber more efficiently.

The object is achieved according to the invention by means of the features of the independent claims. The subclaims that refer back to these relate to advantageous refinements.

A pressure vessel according to the invention has: a reaction chamber as a pressure space for the initiation and/or facilitation of chemical and/or physical pressure reactions of samples accommodated in the reaction chamber; a fluid inlet with a feed valve which is adjustable between an open position, for the feed of a fluid, preferably a flushing gas, into the reaction chamber, and a closed position, for stopping the feed of the fluid; a fluid outlet with a discharge valve, which is adjustable between an open position, for the discharge of a fluid out of the reaction chamber, and a closed position, for stopping the discharge of the fluid out of the reaction chamber; and an oxygen sensor for detecting an oxygen content in the reaction chamber. The pressure vessel furthermore has a control device which is configured to control the feed valve and the discharge valve on the basis of the oxygen content detected by the oxygen sensor, such that the reaction chamber is flushed via the feed and discharge valves situated in the open position, and at least the discharge valve switches from the open position into the closed position as soon as a predetermined oxygen content is undershot.

In other words, by means of the automatically actuated valves and the oxygen sensor, the oxygen content in the reaction chamber is controlled in closed-loop fashion such that oxygen escapes from the reaction chamber via the discharge valve with the aid of the fluid fed via the feed valve until such time as the reaction chamber undershoots a predetermined oxygen content. This is preferably performed until such time as the desired level of oxygen in the reaction chamber is attained, such that the flushing efficiency is increased. The samples accommodated in the reaction chamber are consequently exposed to less oxygen, such that no change to the samples for testing occurs, and the analysis of the samples is thus altogether improved.

Preferably, the control device is configured to control the feed valve such that, after the switch of the discharge valve into the closed position, the feed valve remains in the open position, such that the reaction chamber is pressurized by means of the fluid fed via the feed valve. Thus, the fluid fed to the reaction chamber via the feed valve can act on the samples and preferably the solvents of the samples in order, for example, to increase the boiling points thereof.

The pressure vessel may furthermore have a check valve which is configured to stop the feed of the fluid via the feed valve into the reaction chamber as soon as a particular pressure is reached in the reaction chamber. It can thus be ensured that a particular amount of the fluid is fed to the reaction chamber, or a predefined amount of fluid provided in the reaction chamber is not overshot.

The feed valve and the discharge valve are preferably provided above the sample accommodated in the pressure vessel. The reaction chamber can thus firstly be flushed in an effective manner by means of the fluid, and secondly, the fluid thus reaches the sample in an effective manner in order, for example, to interact therewith in the manner described above. Furthermore, the valves are thus easily accessible.

The pressure vessel may furthermore have a feed line which is connected to the feed valve and to the fluid inlet and which serves for feeding the flushing gas into the reaction chamber. The feed line may for example be connected to a reservoir which has the fluid. It is preferable if the feed line opens into the fluid inlet from outside the pressure vessel.

The pressure vessel preferably furthermore has a discharge line which is connected to the fluid outlet and to the discharge valve and which serves for discharging the oxygen from the reaction chamber. The fluid outlet can thus be easily fluidically connected to the surroundings of the pressure vessel. It is preferable if the discharge line opens into the fluid outlet from outside the pressure vessel.

The oxygen sensor for detecting the oxygen content may be connected to the discharge line downstream of the discharge valve. The oxygen sensor can thus be easily fluidically connected to the reaction chamber from outside the pressure vessel, which consequently benefits easy installation and exchangeability of the oxygen sensor.

The discharge valve is advantageously a high-pressure valve. The oxygen can thus escape at high pressure, and consequently in particular quickly, from the reaction chamber.

The fluid may be a reductive gas. A change to the samples owing to contact with oxygen can thus be prevented in a particularly effective manner. An inert gas and/or a fluid which has argon and/or hydrogen is also suitable for preventing a change to the samples in an effective manner. These have a reducing action on the, in particular sensitive, samples, and can thus fully preserve these, or do not cause any depletion reaction. It is particularly preferable if the fluid has 5 vol. % hydrogen.

The pressure vessel preferably furthermore has a pressurized-air valve for raising at least the reaction chamber relative to the pressure vessel by means of pressurized air fed into the pressure vessel via the pressurized-air valve. The control device is configured to automatically actuate the pressurized-air valve in order to raise the reaction chamber on the basis of an operating parameter (automatically) detected by the control device, for example an end of a reaction. Thus, in particular, the operability of the pressure vessel is simplified. Furthermore, it is thus possible without a time delay, that is to say immediately after the detection of the operating parameter, for the reaction chamber to be raised in order, for example, to remove the samples situated therein and/or in order to perform servicing or maintenance on the pressure vessel. This thus benefits in particular the efficiency of the handling of the pressure vessel.

The invention furthermore relates to a method for flushing a reaction chamber by means of a pressure vessel as described above. The method has the following steps: flushing the reaction chamber via the fluid inlet and the fluid outlet and the open feed and discharge valves by means of a fluid; detecting the oxygen content in the reaction chamber with the oxygen sensor; closing at least the discharge valve as soon as the detected oxygen content undershoots a predetermined oxygen content. The above-stated advantages of the pressure vessel according to the invention apply analogously to the method. That is to say, the method gives rise in particular to increased flushing efficiency.

BRIEF DESCRIPTION OF THE DRAWINGS

The invention will be described by way of example below on the basis of the figures, which illustrate advantageous exemplary embodiments of the invention. In the drawings.

DETAILED DESCRIPTION OF THE PREFERRED EMBODIMENTS

Figure 1:
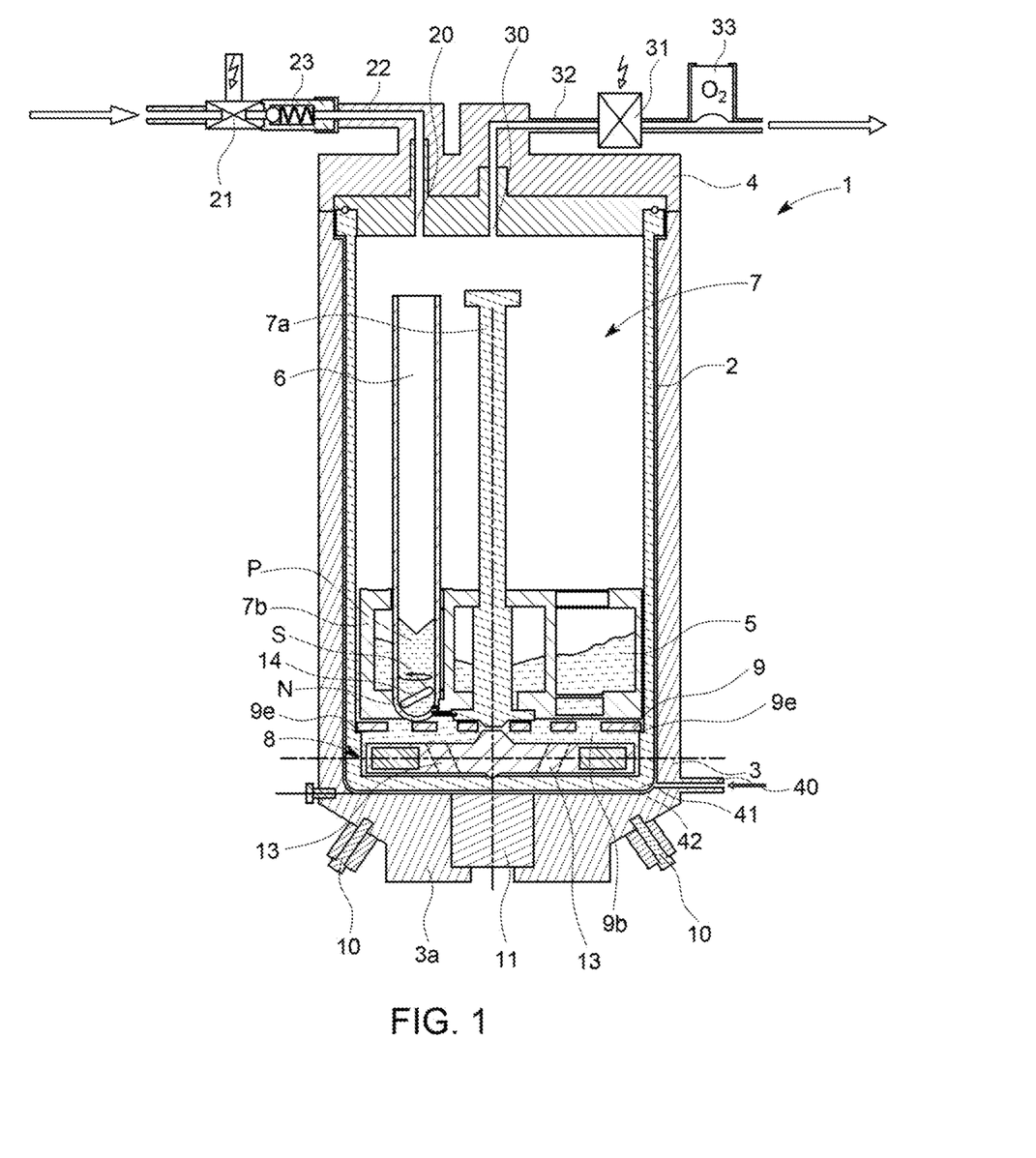
FIG. 1 shows a schematic sectional view of an exemplary embodiment of the pressure vessel according to the invention.

FIG. 1 shows an exemplary embodiment of a pressure vessel 1 according to the invention for accommodating samples P which are to be heated, for the initiation and/or facilitation of chemical and/or physical pressure reactions on the samples P. The sample P may for example have solids such as sand, soil, earth and/or leaves. The pressure vessel 1 is however not restricted to a particular sample P. In particular, in the pressure vessel 1, any type of sample may be subjected to a pressure reaction and heating, in particular samples with high viscosity or high solids fractions.

The pressure vessel 1 may be a (high-pressure) autoclave. The pressure vessel 1 is preferably composed of a high-pressure-resistant material such as for example metal, preferably steel, particularly preferably a corrosion-resistant high-grade steel alloy. The pressure vessel 1 is in this case preferably formed such that it can be used at pressures up to at least 200 bar, preferably up to at least 500 bar, and at temperatures of up to and even above 300° C.

The pressure vessel 1 furthermore has a reaction chamber or a pressure space 2 for the initiation and/or facilitation of the chemical and/or physical pressure reactions on the samples P. It can be seen that the pressure vessel 1 surrounds the reaction chamber 2, specifically preferably on all sides. The sample or samples P is/are, for the sample processing, arranged in the reaction chamber 2, and is/are removable therefrom preferably through an opening.

The pressure vessel 1 preferably has a (pot-shaped) lower part 3 and a cover part 4, which can be closed together and which, in the closed state, surround the reaction chamber 2 on all sides. Here, the cover 4 closes the opening for the introduction and removal of the sample P, which opening is provided in the pressure vessel 1, that is to say in the lower part 3 of the pressure vessel 1. By means of the cover 4, the pressure vessel 1 and/or the reaction chamber 2 can consequently be opened and closed.

As can be seen in particular from FIG. 1, the reaction chamber 2 is furthermore designed to accommodate a liquid or base load 5. The liquid 5 is preferably water, though it may also be or have any other highly microwave-absorbent liquid. The liquid 5 is in this case provided in particular for heating or warming the sample P that is situated in the pressure vessel 1 or in the reaction chamber 2. This may be performed for example by virtue of the sample P being at least partially surrounded by the liquid 5, and a microwave generator (not illustrated in any more detail) warming the liquid 5 by microwave absorption.

The sample P may be provided in a sample vessel 6 such as for example a test tube. The sample P is preferably provided in the pressure vessel such that the liquid 5 extends at least to a part of the height of the sample P. Provision may however also be made for the liquid 5 to extend over the height of the sample P. The pressure vessel 1 or the reaction chamber 2 is preferably designed to accommodate two or more samples P. Correspondingly, it is also possible for multiple sample vessels 6 to be provided, that is to say at least one sample vessel 6 for accommodating in each case one sample P.

Figure 2:
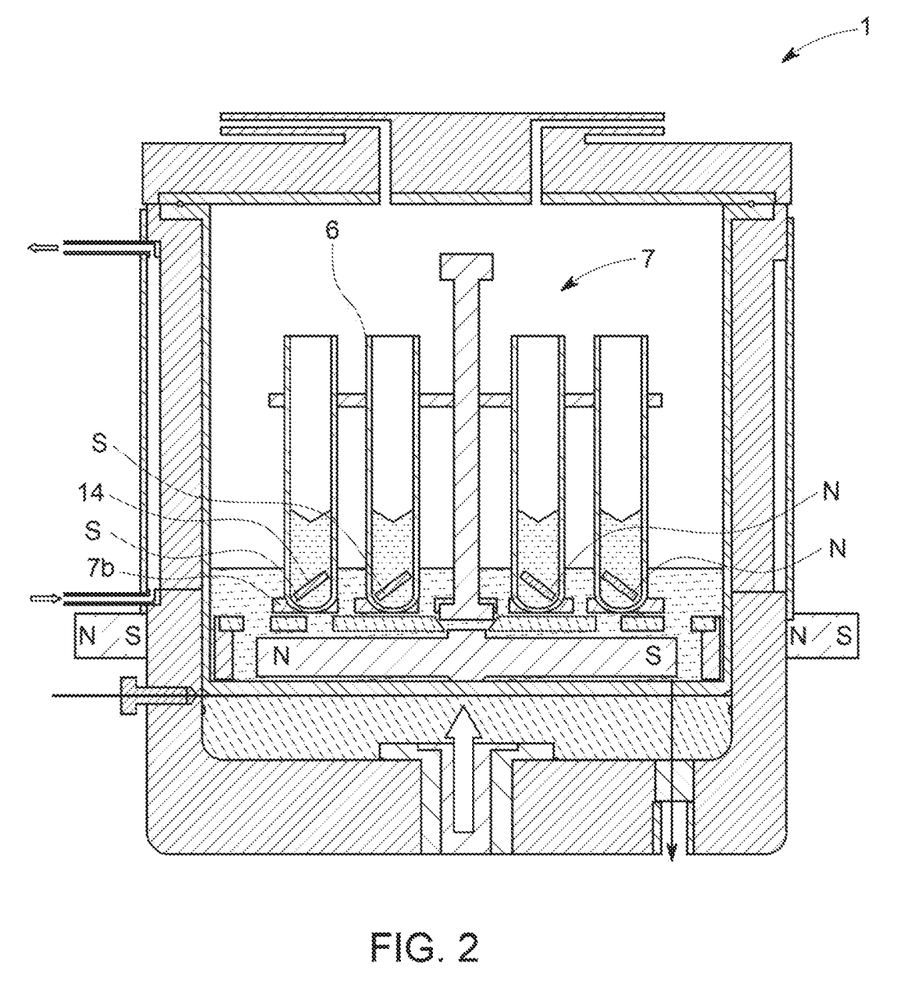
FIG. 2 shows a schematic sectional view of an embodiment of the sample holder.

The pressure vessel 1 may furthermore have a sample holder 7, by means of which the sample vessel 6 can be held in the reaction chamber 2. The sample holder 7 preferably bears the at least one sample vessel 6 such that the sample vessel 6 is situated in the liquid 5. The sample holder 7 in particular designed for placing the at least one sample P or the at least one sample vessel 6 into the reaction chamber 2, and for removing the at least one sample P or the at least one sample vessel 6 from the reaction chamber 2 again, for example by means of a handle 7a. The sample holder 7 may furthermore have a sample vessel accommodating region 7b, which is preferably designed correspondingly to the sample vessel 6. The sample vessel accommodating region 7b may have multiple regions in order to accommodate a sample vessel 6 by means of a respective region. The sample vessel accommodating region 7b has the effect in particular that the sample vessels 6 are provided in a particular pattern, that is to say for example are arranged in circular form around the handle 7a. As can be seen in FIG. 1, the sample vessels may for example be 30o arranged on a single circle around the handle 7a. As can be seen in FIG. 2, the sample holder 7 may also accommodate multiple sample vessels 6 on different radii or circles around the handle 7a. The sample vessel accommodating region 7b may in particular be formed correspondingly to the inner wall of the reaction chamber 2, in order to thus hold the sample holder 7 in the reaction chamber 2 in a defined manner.

The pressure vessel 1 may furthermore have a magnetic disk 8 which is mounted in the reaction chamber 2 so as to be rotatable about an axis of rotation. The magnetic disk 8 has a shape typical of a disk, that is to say in particular a flat and/or (circular) rounded form. The magnetic disk 8 is preferably provided in the reaction chamber 2 such that—when the liquid 5 is present in the reaction chamber 2—the magnetic disk 8 is provided in the liquid 5. In particular, the magnetic disk 8 may be provided in a lower region of the reaction chamber 2, preferably on the base of the reaction chamber 2. The magnetic disk 8 preferably extends substantially over the entire base surface of the reaction chamber 2, and thus leaves only a small gap between magnetic disk 8 and reaction chamber 2.

The pressure vessel 1 may furthermore have a plate or a pedestal 9 which is provided in the reaction chamber 2 and which is permeable to the liquid 5. It can be seen that the plate 9 defines, together with the reaction chamber 2, in particular with the base of the reaction chamber 2, a space in which the magnetic disk 8 can be mounted. For this purpose, the plate 9 may for example be placed in the reaction chamber 2 and/or connected to the side walls of the reaction chamber 2 (for example by way of an edge or a projection 9e, see FIG. 1). Alternatively, the plate 9 may be connected by means of side walls, which extend away from the plate 9, to the base of the reaction chamber 2.

The plate 9 that is provided in the liquid 5 is permeable to the liquid 5, for example by way of holes or passage openings 9b. The holes 9b are preferably arranged so as to be distributed uniformly over the surface of the plate 9. It is preferable if the plate 9 is produced from a ceramic material such as for example silicon carbide. Since these materials are highly microwave-absorbent, it is thus possible for the plate 9 that is provided in the liquid 5 to be heated by means of microwave radiation, such that the liquid 5 is heated both directly by microwave absorption and also indirectly by release of heat from the plate 9.

The sample holder 7 is preferably mounted on the plate 9. The sample holder 7 is preferably designed, for example by means of a correspondingly designed bearing region, for mounting the sample holder in the reaction chamber 2 in a defined position and preferably in an immovable manner.

The pressure vessel 1 may furthermore have at least one electromagnet 10 provided outside the reaction chamber 2. The pressure vessel 1 preferably has multiple electromagnets 10, which are distributed uniformly about the above-mentioned axis of rotation or about the circumference of the reaction chamber 2. By means of the at least one electromagnet 10, a magnetic field which rotates (in a circle) is formed for driving the magnetic disk 8 in rotation about its axis of rotation. For this purpose, the at least one electromagnet 10 is preferably designed correspondingly to a stator of a synchronous or stepper motor. To generate the rotating magnetic field, the pressure vessel 1 may have a control unit (not illustrated in any more detail) which is functionally connected to the at least one electromagnet 10. The control unit preferably controls the electromagnet 10 in a manner known in the case of synchronous motors or stepper motors, that is to say for example in sinusoidal fashion. The control unit may in particular be configured to control an alternating current that is fed into the electromagnet 10, that is to say in particular to set the frequency of the alternating current. Through setting of the frequency of the alternating current, it is thus possible for the rotational speed of the magnetic field and consequently the rotational speed of the magnetic disk to be changed/varied.

The electromagnet 10 is preferably formed as a magnet or field coil and/or as a field coil ring. The electromagnet 10 may however also be any other element for generating a magnetic field or a rotating magnetic field. The electromagnet 10 is preferably produced from a ferromagnetic material. The electromagnet 10 is preferably connected fixedly or reconnectably to the outer wall of the pressure vessel 1. As can be seen in FIG. 1, the electromagnet 10 is preferably provided below the magnetic disk 8. For this purpose, provision may be made in particular whereby the electromagnet 10 is provided in the housing lower part 3, preferably in the pressure vessel base 3a. It can be seen in particular that the electromagnet 10 may be provided adjacent to the (pressure-tight) microwave coupling-in means 11. Through the provision of the electromagnet 10 below the magnetic disk 8, it is achieved in particular that the electromagnet 10 is easily accessible from below the pressure vessel 1, for example in order for the electromagnet 10 to be easily installed.

Since the magnetic disk 8 is situated in the rotating magnetic field effected by the electromagnet 10, a rotational speed of the magnetic disk 8 will be set which corresponds to the rotational speed of the magnetic field effected by the electromagnet 10. The magnetic disk 8 is, with regard to the magnetization, preferably formed correspondingly to a rotor of a synchronous or stepper motor. For the magnetization of the magnetic disk 8, the magnetic disk 8 may have a permanent magnet and/or an externally excited magnet—that is to say a magnet which is operated with a feed of current.

As an alternative to the electromagnet 10, the pressure vessel 1 may also have some other magnet arrangement, for example a rotatably provided permanent magnet which is arranged preferably outside the pressure vessel 1, such that the rotating magnetic field for driving the magnetic disk in rotation is generated by means of the rotation of the permanent magnet. The above statements relating to the electromagnet 10 apply analogously to a magnet arrangement of said type.

It can furthermore be seen that the magnetic disk 8 may have at least one passage bore 13 extending transversely with respect to the axis of rotation of the magnetic disk 8. The passage bore 13 is preferably provided so as to run through the magnetic disk 8 in a direction upward and away from the axis of rotation of the magnetic disk 8. The passage bore 13 may thus run through the magnetic disk 8 in a direction radial with respect to the direction of rotation of the axis of rotation. Alternatively or in addition, the at least one passage bore 13 may run through the magnetic disk in a direction tangential with respect to the direction of rotation of the axis of rotation. This has the advantage in particular that, by changing the direction of rotation of the magnetic disk 8, the direction of the flow of the liquid through the passage bore 13 can be changed. It is particularly preferable if the respective passage bore 13 is of entirely straight form, and its longitudinal axis is provided transversely with respect to the axis of rotation of the magnetic disk 8. The respective passage bore 8 is thus provided at an angle with respect to the axis of rotation of the magnetic disk 8, which preferably lies in a range from 10 to 80 degrees and particularly preferably 45 degrees +/−5 to 10 degrees.

Through the above-described provision of the passage bore 13, the liquid 5 accommodated in the reaction chamber 2 can, by rotation of the magnetic disk 8, be driven through the passage opening 13 in order to stir the liquid 5. By means of the stirring effect, the liquid 5 is forced in a direction upward and outward, and consequently rises up the inner wall of the reaction chamber 2. Consequently, a substantially U-shaped liquid level is formed as viewed in section. The liquid 5 is thus driven from one side of the magnetic disk 8, for example from the bottom side thereof, to another side of the magnetic disk 8, for example to the top side thereof, in order to thus allow the liquid 5 to circulate for the purposes of the stirring. The liquid 5 circulates in the reaction chamber 2 by flowing through the gap between magnetic disk 8 and plate 9, through the gap between magnetic disk 8 and the base of the reaction chamber 2, through the gap between magnetic disk 8 and the inner wall of the reaction chamber 2, and/or through the passage opening 13. The passage bore 13 thus effects stirring or swirling of the liquid 5, whereby the liquid 5 warms up more quickly and more uniformly, and the sample P is thus more efficiently heated. For intensification of the abovementioned stirring effect, it is preferable if the magnetic disk 8 has multiple, that is to say at least two, preferably three, particularly preferably four passage bores 13, which are preferably distributed uniformly about the axis of rotation of the magnetic disk 8.

The pressure vessel 1 is however not restricted to stirring of this type. In particular, it is also possible for other stirring means to be used for stirring the liquid 5, such as for example a stirring bar mounted on a stirring shaft, or the like.

As can also be seen, the respective sample vessel 6 may have a stirring magnet 14 for stirring the sample P accommodated in the sample vessel 6. The stirring magnet 14 is preferably a permanent magnet with North-South polarity. The stirring magnet 14 preferably has an elongate form in order to thus stir the sample P over the entire length of said stirring magnet. The stirring magnet 14 may be formed so as to lie obliquely in the sample vessel 6. The stirring magnet 14 is preferably formed as a stirring flea. The stirring magnet 14 may however generally have any form which is suitable for stirring the sample P, that is to say for example also a propeller form or the like.

The stirring magnet 14 is provided relative to the magnetic disk 8 such that the stirring magnet 14 is set in motion by the rotating magnetic field of the electromagnet 10 and/or of the magnetic disk 8. For this purpose, it is particularly advantageous if the stirring magnet 14 is provided in a (lower) part of the sample vessel 6 which is provided directly opposite the magnetic disk 8 and/or the plate 9, such that the magnetic field of the magnetic disk 8 acts on the stirring magnet 14 in an effective manner. The respective magnetic field of the magnetic disk 8 and/or of the electromagnet 10 thus moves relative to the sample vessel 6, whereby the stirring magnet 14 is set in motion or rotation which corresponds to the rotation of the respective magnetic field or of the magnetic fields. By means of this motion, the sample P is consequently stirred by means of the stirring magnet 14, whereby it is possible in particular for samples with high viscosity or high solids fractions to be homogenized in an efficient manner.

The pressure vessel 1 may have any means for directly or indirectly releasing heat for the purposes of warming or heating in particular the liquid 5, the plate 9 and/or the samples P. It is preferable if the pressure vessel 1 has a microwave generator (not illustrated in any more detail) which couples microwaves into the reaction chamber 2 via the microwave coupling-in region 11. Here, the microwaves that are generated pass into the reaction chamber 2 preferably via the magnetic field of the magnetic disk 8 and/or of the electromagnet 10, such that the magnetic field can interact with the coupled-in microwaves, for example in order to effect an advantageous diversion of the microwaves.

The pressure vessel 1 furthermore has a fluid inlet 20 with a feed valve 21. The feed valve 21 is adjustable between an open position, for the feed of a fluid into the reaction chamber 2, and a closed position, for stopping the feed of the fluid. The feed valve 21 is preferably an electrically actuatable valve. The feed direction is indicated schematically by means of the arrow pointing toward the feed valve 21. The fluid may for example be a flushing gas. In particular, any fluid which has little to no oxygen is conceivable. The fluid is preferably a reductive gas, particularly preferably an inert gas, argon and/or fluid having hydrogen. The fluid particularly preferably has 5 vol. % or less of hydrogen. The latter fluid is particularly advantageously suitable because it is non-combustible.

For the feed of the fluid, the feed valve 21 is preferably fluidically connected to a fluid reservoir (not illustrated in any more detail) such as for example a container or tank which contains the fluid. The tank which has the fluid may be provided in the vicinity of the pressure vessel 1 or even so as to be integrated in the pressure vessel 1, for example in a casing which accommodates the pressure vessel 1.

The feed valve 21 is preferably provided above the sample P accommodated in the pressure vessel 1. In particular, the feed valve 21 may be arranged above the cover 4. The feed valve 21 is preferably arranged outside the reaction chamber 2 and/or the pressure vessel 1 in order to thus provide good accessibility to the feed valve 21. It is preferable if the feed valve 21 releases the fluid via the fluid inlet 20 into the reaction chamber 2 such that the fluid is fed into the reaction chamber 2 from above the sample P or from above the sample vessel 6. The fluid can thus reach the sample P in a particularly effective manner in order, for example, to interact therewith and/or remove oxygen therefrom. In a particularly preferred embodiment, provision may also be made for the fluid to be fed to the reaction chamber 2 in a direction perpendicular to the sample P or in the direction of the longitudinal axis of the sample vessel 6.

It can also be seen that a feed line 22 may be provided, which fluidically connects the fluid inlet 20 at least to the feed valve 21. For this purpose, the feed line 22 preferably runs at least partially outside the pressure vessel 1 in order to fluidically connect the feed valve 21, which is provided outside the pressure vessel 1, to the fluid inlet 20 that opens into the reaction chamber 2. The feed line 22 is preferably formed at least partially integrally with the cover 4. That end of the feed line 22 which is situated upstream of the feed valve 21 is preferably designed to be connected to the abovementioned reservoir. For a particularly compact design of the pressure vessel 1, the feed line 22 may preferably extend above the cover 4 and subsequently to the side of the pressure vessel 1.

The pressure vessel 1 may furthermore have a check valve 23 or a valve which permits a flow of the fluid only in one direction. The check valve 23 is configured to stop the feed of the fluid via the fluid inlet 20 into the reaction chamber 2 as soon as a particular pressure has been reached in the reaction chamber 2. For this purpose, it is preferable if the check valve 23 is provided downstream of the feed valve 21 and in the feed line 22. In particular, the check valve 21 may be provided outside the pressure vessel 1.

The check valve 23 is thus arranged between fluid inlet 20 and feed valve 21, such that the pressure of the reaction chamber 2 can act on one side of the check valve 23, for example via the feed line 22. The check valve 23 preferably has an elastic element such as for example a spring, which forces the check valve 23 into a closed position in which the fluid cannot be fed to the reaction chamber 2. That is to say, if no fluid is fed via the feed valve 21 or the fluid is fed at a pressure which does not overcome the bracing force of the feed valve 21, then the check valve 23 is situated in the closed position, in which no fluid can pass via the fluid inlet 20 into the reaction chamber 2. If the feed valve 21 conveys the fluid in the direction of the check valve 23 at such a pressure that said fluid overcomes the restoring force of the check valve 23, then fluid is fed to the reaction chamber 2. If the pressure prevailing in the reaction chamber 2, which is caused in particular by the fed fluid, overshoots the pressure of the fluid fed via the feed valve 21, then the check valve 23 is moved back into its closed position. Thus, the fluid inlet 20 is automatically closed off to the outside, by means of the check valve 23, when a particular pressure prevailing in the reaction chamber 2 is exceeded or when a particular amount of fluid accommodated in the reaction chamber 2 is exceeded.

The pressure vessel 1 furthermore has a fluid outlet 30 with a discharge valve 31. The discharge valve 31 is adjustable between an open position, for the discharge of a fluid out of the reaction chamber 2, and a closed position, for stopping the discharge of the fluid out of the reaction chamber 2. That is to say, via the discharge valve 31 situated in the open position, it is possible in particular for oxygen and the fluid fed via the feed valve 21 to be discharged out of the reaction chamber 2.

In other words, by means of the fluid fed via the feed valve 21, a positive pressure is generated in the reaction chamber 2, such that at least a part of the fed fluid and in particular oxygen is discharged via the fluid outlet 30 and the discharge valve 31 to a location outside the reaction chamber 2 and the pressure vessel 1. Provision may also be made for the discharge valve 31 to be designed, or at least connected to corresponding means, for forming, in the open position, a negative pressure with respect to the reaction chamber 2, in order to thus in particular draw oxygen out of the reaction chamber 2.

The discharge valve 31 is preferably provided above the pressure vessel 1 or above the sample P accommodated in the pressure vessel 1. It is particularly preferable if the discharge valve 31 is provided outside the reaction chamber 2 and/or the pressure vessel 1, for example in order to permit easy access to the discharge valve 31. The discharge valve 31 may however also be provided in some other way, for example so as to be integrated into the cover 4 of the pressure vessel 1.

The pressure vessel 1 may furthermore have a discharge line 32 which fluidically connects the fluid outlet 30 to at least the discharge valve 31. Here, the discharge line 32 is preferably provided so as to extend from the fluid outlet 30 to the outside of the pressure vessel 1 at least as far as the discharge valve 31. The discharge line 32 thus preferably opens into the fluid outlet 30 from outside the pressure vessel 1. It can also be seen that the fluid outlet 30 or the discharge line 32 may be provided such that fluid is introduced into these in a direction parallel to the fluid inlet direction. The discharge line 32 may be formed at least partially integrally with the pressure vessel 1, preferably with the cover 4. The discharge line 32 preferably extends in a manner corresponding to the feed line 22, that is to say in particular from the fluid outlet 30 to a position above the pressure vessel 1 and subsequently to the side of the pressure vessel 1, that is to say away from the feed line 22. The pressure vessel can thus be designed to be more compact.

The pressure vessel 1 furthermore has an oxygen sensor 33 for detecting an oxygen content in the reaction chamber 2. If the discharge line 32 is present, then the oxygen sensor 33 is fluidically connected to the discharge line 32. In the exemplary embodiment illustrated in FIG. 1, the oxygen sensor 33 is provided outside the reaction chamber 2 and/or the pressure vessel 1 in order to be easily accessible, for example for the purposes of installation and/or servicing. It can furthermore be seen that the oxygen sensor 33 may be provided downstream of the discharge valve 31. The oxygen sensor 33 may however also be provided upstream of the discharge valve 31.

The oxygen sensor 33 detects the oxygen content/oxygen fraction in the reaction chamber 2, preferably such that, the oxygen content in the reaction chamber 2 is inferred on the basis of the oxygen content of an amount of the fluid that is discharged from the reaction chamber 2. Provision may however also be made for the oxygen sensor 33 to measure the absolute quantity of discharged oxygen and to then, by means of a balancing, infer the absolute quantity of oxygen and thus the (relative) oxygen content in the reaction chamber 2. Provision may alternatively also be made for the oxygen sensor 33 to be provided within the pressure vessel 1 or the reaction chamber 2 in order to directly measure the oxygen content in the reaction chamber 2.

The pressure vessel 1 furthermore has a control device (not illustrated in any more detail) which is functionally connected at least to the feed valve 21, to the discharge valve 32 and to the oxygen sensor 33. More specifically, the value of the oxygen content detected by the oxygen sensor 33 is transmitted to the control device, such that the control device controls at least the discharge valve 31 and preferably also the feed valve 21 correspondingly on the basis of said value or oxygen content. According to the invention, the control device controls the feed valve 21 and the discharge valve 31 on the basis of the abovementioned oxygen content such that the discharge valve 31 switches from the open position into the closed position as soon as a predetermined oxygen content is undershot. The predetermined oxygen content may for example be input by means of a user interface or the like, transmitted to the control device, and consequently stored in the latter. The predetermined oxygen content is preferably of such a value that this causes no change to the samples P. The (predetermined) oxygen content is preferably specified in vol. % and, in a preferred embodiment, lies in a range from 0 to 10 vol. %, in particular in a range from 0 to 8 vol. %, and is for example 5 vol. %. The invention is not restricted to the abovementioned values (value ranges); it is rather possible for these to be specified and set correspondingly as desired or in accordance with the requirements for the reaction. That is to say, as long as the oxygen content provided in the reaction chamber 2 lies above the predetermined oxygen content, the reaction chamber 2 is flushed via the feed valve 21 and discharge valve 31 which are each situated in the open position, that is to say in particular oxygen is discharged from the reaction chamber 2.

It is preferable if the control device is furthermore configured to control the feed valve 21 such that the feed valve 21 remains or pauses in the open position after the switch of the discharge valve 31 into the closed position—that is to say as soon as the predetermined oxygen content has been undershot. Thus, the reaction chamber 2 is pressurized by means of the fluid fed via the feed valve 21, in order, in particular, to interact with the samples P, that is to say for example to increase the boiling point of said samples and preferably also of the solvents of the samples. Provision may alternatively also be made for the control device to be configured such that, also, or at the same time as the discharge valve 31, the feed valve 21 switches into the closed position as soon as the predetermined oxygen content has been undershot.

Provision may furthermore be made whereby the control device closes the feed valve 21 under additional or alternative conditions. For example, the control device may control the feed valve 21 such that the latter is moved into the closed position as soon as a particular amount of the said fluid is present in the reaction chamber 2 and/or the fed fluid has given rise to a particular pressure in the reaction chamber 2. For this purpose, the pressure vessel 1 may have a pressure sensor (not illustrated in any more detail) which is functionally connected to the control device and which is provided for measuring the pressure within the reaction chamber 2. The pressure value thus detected is then transmitted to the control device and compared, in the control device, with a pressure value predetermined and/or stored in the control device. Said pressure value may for example likewise be input by means of the above-described user interface or in some other way, transmitted to the control device, and consequently stored therein. The control device then decides, on the basis of the comparison of the detected pressure value with the predetermined pressure value, whether or not the feed valve 21 should be closed. In particular if the detected pressure value overshoots the predetermined pressure value, the control device may decide to switch the feed valve 21 into the closed position. Alternatively or in addition, the pressure vessel 1 may also have other means for detecting the fluid content in the pressure vessel 1 in order to thus decide, analogously to the manner described above, whether or not the feed valve 21 should be closed.

The control device may furthermore be designed such that, after the end of the pressure reactions in the reaction chamber 2, the control device actuates at least the discharge valve 31 such that the latter switches into the open position. By means of the pressure prevailing in the reaction chamber 2, it is thus possible for the fluid present in the reaction chamber 2, and preferably also gases or fluids that have formed during the pressure reactions, to be discharged from the reaction chamber 2 via the discharge valve 31. Alternatively or in addition, the control device may also be configured to actuate the feed valve 21, such that the latter switches into the open position, after the end of the pressure reaction. It is thus possible, for example by means of further flushing, for the fluid present in the reaction chamber 2, that is to say in particular the previously fed fluid and preferably also the gases that are formed during the pressure reaction, to be discharged particularly quickly via the discharge valve 31 to a location outside the reaction chamber 2.

A pressurized-air valve 40 can furthermore be seen in FIG. 1, which may be provided in order to raise the reaction chamber 2 relative to the pressure vessel 1 by means of (compressed) pressurized air that is fed via the pressurized-air valve 40. This may be performed for example by virtue of the pressurized air that is fed via the pressurized-air valve 40 being conveyed via a pressurized-air inlet 41 into a space 42 provided between reaction chamber 2 and pressure vessel 1. In the space 42, a pressure is thus built up by means of the pressurized air, which pressure gives rise to a force inter alia on the reaction chamber 2. If said force is greater than the force of the weight of the reaction chamber 2 and of the components and samples P accommodated therein, then the volume of the space increases, and the reaction chamber 2 is consequently raised relative to the pressure vessel 1. As illustrated by way of example in FIG. 1, the space 42 may, in a non-raised state of the reaction chamber 2, be formed by a lower region of the reaction chamber 2, for example by a beveled base of the reaction chamber 2. That is to say, the space 42, which is variable in size, is formed preferably by the inside base region of the pressure vessel 1 and the outside base region of the reaction chamber 2. By means of such a feed of pressurized air, it is consequently possible for the reaction chamber 2 to be pushed in a direction to the outside, that is to say in particular through the opening of the pressure vessel 1, in order, for example, for the samples P to thus be easily removed from the reaction chamber 2.

The pressurized-air valve 40 is furthermore functionally connected to the control device, such that the control device automatically actuates the pressurized-air valve 41 in order to raise the reaction chamber 2 on the basis of an (automatically detected) operating parameter. The operating parameter may for example be the end of a reaction or other parameters representative of the reaction (for example the attainment of a critical fluid content) which can be automatically detected by means of corresponding sensors and/or initiated by a user. The operating parameter may also be representative of a state of the pressure vessel or of the reaction chambers in which the pressure vessel or the reaction chamber should/must be subjected to servicing and/or maintenance. Following the detection of the corresponding operating parameter, the reaction chamber 2 is raised in the manner described above. An operator of the pressure vessel 1 thus does not have to perform any further actions in order for the reaction chamber 2 to be raised (directly) following the detection of the corresponding operating parameter.

In particular with reference to FIGS. 3 to 5, an exemplary method for performing flushing of a reaction chamber by means of the pressure vessel 1 will be described below.

Figure 3:
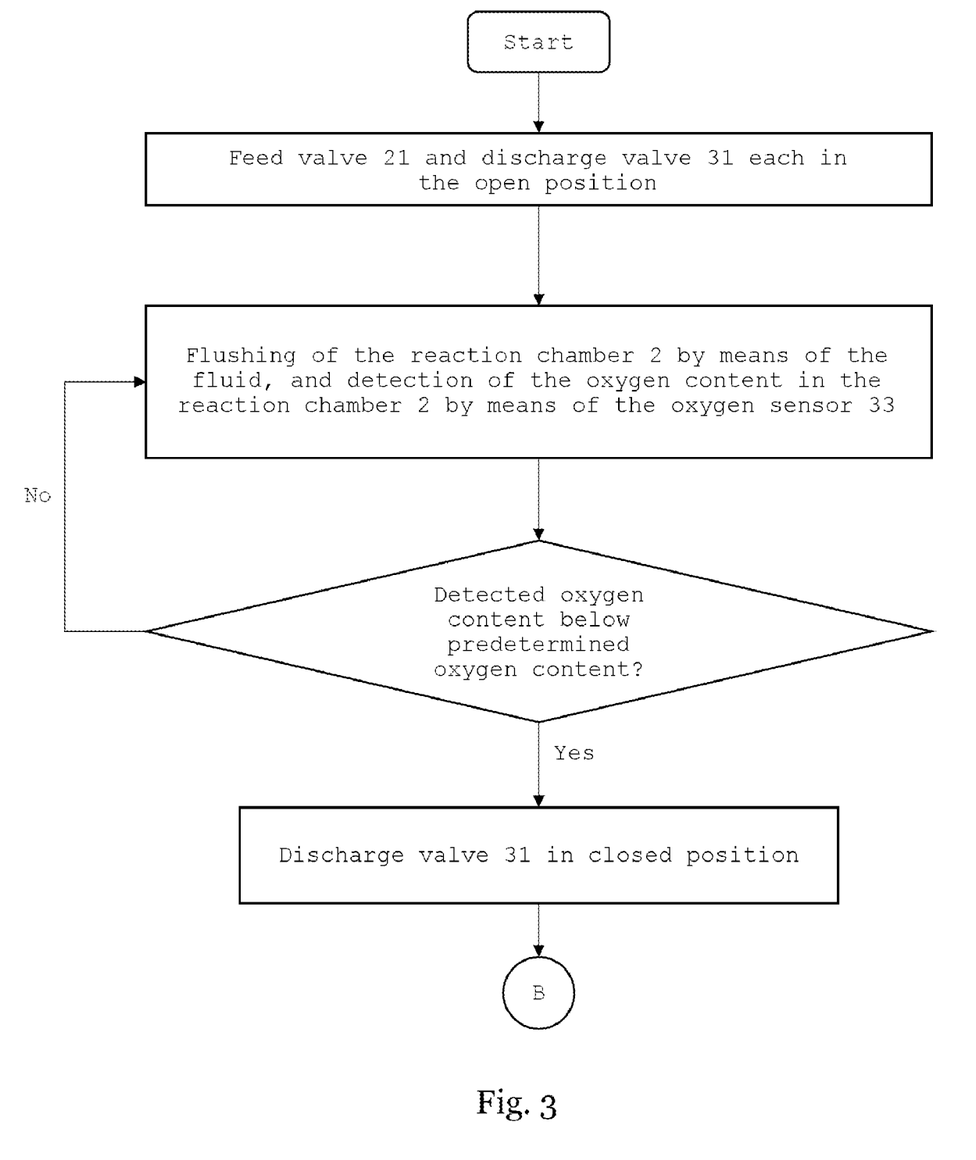
FIG. 3 shows method steps of a preferred method according to the invention.

As illustrated in FIG. 3, at the start, both the feed valve 21 and the discharge valve 31 are each situated in the open position. By means of a feed of the fluid via the feed valve 21 and the fluid inlet 20 and discharge of the fluid via the discharge valve 31 and the fluid outlet 30, the reaction chamber 2 is flushed by means of the fluid. At the same time, the oxygen content in the reaction chamber 2 is measured/detected by means of the oxygen sensor 33. As soon as the oxygen content thus detected undershoots a predetermined oxygen content, at least the discharge valve 31 is moved into the closed position. In another exemplary embodiment, the feed valve 21 is also closed at the same time. If the predetermined oxygen content has not been undershot, then the above-described flushing process is continued until the oxygen content in the reaction chamber 2 undershoots the predetermined oxygen content.

Figure 4:
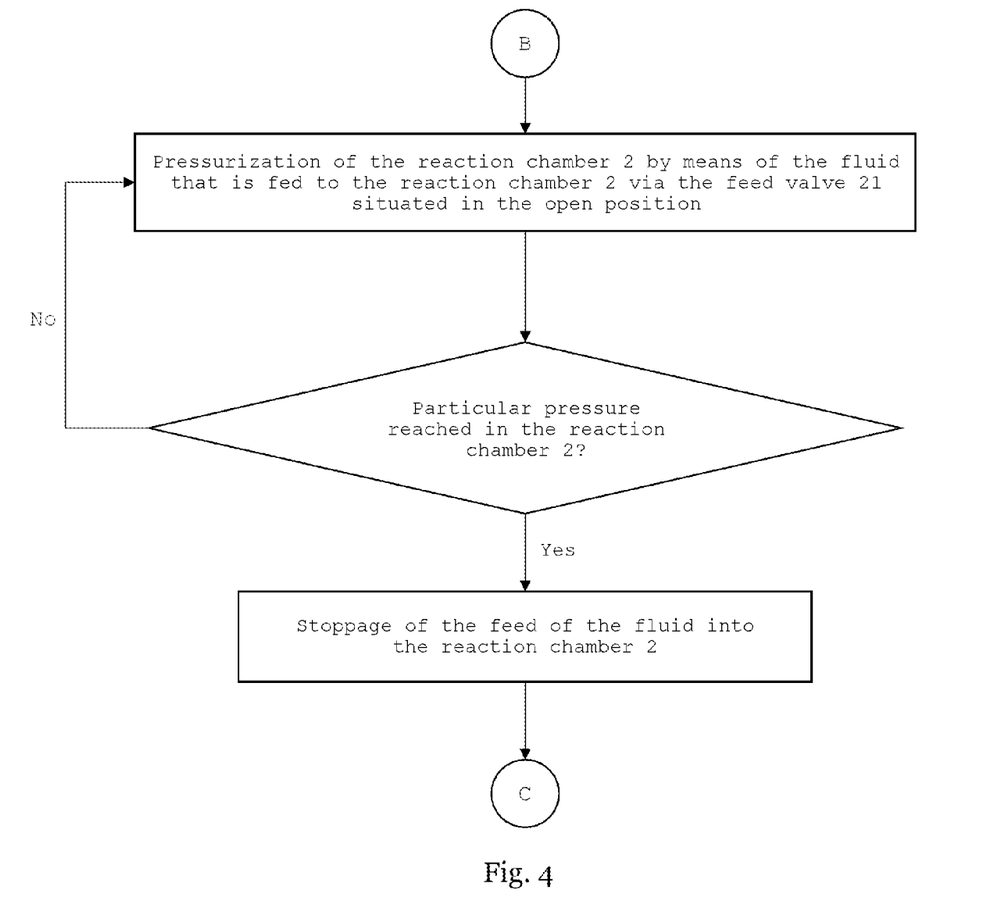
FIG. 4 shows preferred method steps that follow the method steps illustrated in FIG. 3.

FIG. 4 shows the preferred continuation of the method, in which the feed valve 21 (initially) pauses in the open position if the predetermined oxygen content has been undershot. Since the discharge valve 31 is now situated in the closed position, the fluid can continue to be fed to the reaction chamber 2 via the feed valve 21. This is preferably performed until a predetermined pressure has been reached in the reaction chamber 2, and/or a particular amount of the fluid is present in the reaction chamber 2. Corresponding sensors may be provided for this purpose for example in the reaction chamber 2, in order to measure the pressure prevailing in the reaction chamber 2 and/or the amount of the fluid. If the thus detected pressure and/or the thus detected amount of the fluid overshoots a correspondingly determined value, the feed valve 21 switches into the closed position. This process of stopping the feed of the fluid owing to an excessively high pressure or adequate amount of fluid in the reaction chamber 2 may also alternatively or additionally be initiated by means of the check valve 23 as described above.

Figure 5:
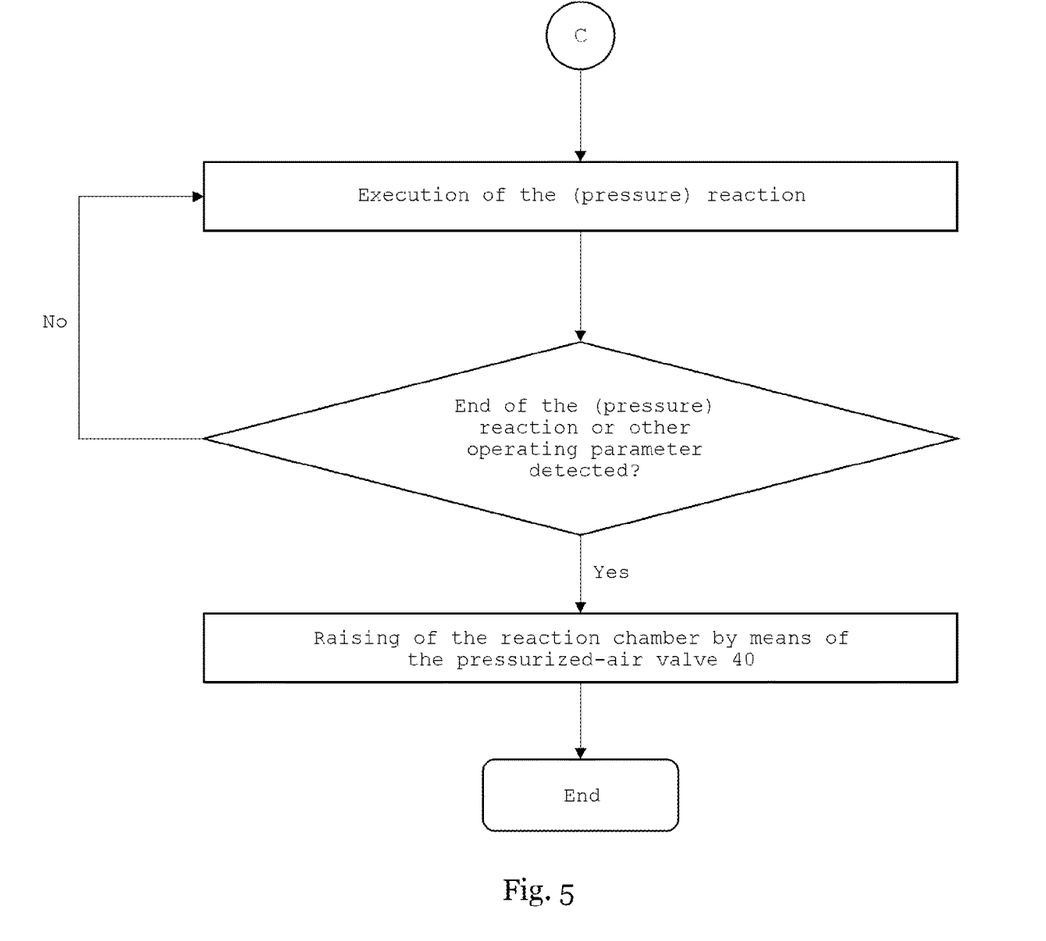
FIG. 5 shows preferred method steps that follow the method steps illustrated in FIG. 4.

As illustrated in FIG. 5, the control device may subsequently activate corresponding means, that is to say in particular the microwave generator and/or the electromagnets 10 for stirring the liquid 5 by means of the magnetic disk 8, in order that the pressure reaction can take place. The pressure reaction preferably runs until the user of the pressure vessel 1 so desires and/or until particular operating parameters (automatically) detect the end of a reaction. On the basis of the end of a reaction or of some other automatically detected operating parameter (for example servicing or maintenance of the pressure vessel or of the reaction chamber), the control device may then activate the pressurized-air valve 40 in order that the reaction chamber 2 is raised, in the manner described above. Subsequently, the user of the pressure vessel 1 can for example remove the samples P from the reaction chamber 2.

As a result, a pressure vessel 1 is thus provided which, aside from more efficient flushing, also permits easier operation in that, in particular, the discharge of oxygen from the reaction chamber 2 is performed automatically until the desired oxygen content is attained. Oxygen can thus be removed from the reaction chamber 2 in order that said oxygen does not chemically change or even destroy the samples P provided in the reaction chamber 2. Consequently, the pressure reaction can be performed on chemically unchanged or the original samples, such that the subsequent analysis of the reaction products is significantly improved, that is to say in particular more authoritative analysis results can be provided.

Here, the invention is not restricted to the features described above. In particular, all of the features described above may be combined with one another in any desired manner.

The invention claimed is:

1. Pressure vessel (1), comprising:
   a reaction chamber (2) as a pressure space for the initiation and/or facilitation of chemical and/or physical pressure reactions of samples (P) accommodated in the reaction chamber (2),
   a fluid inlet (20) with a feed valve (21) which is adjustable between an open position, for the feed of a fluid into the reaction chamber (2), and a closed position, for stopping the feed of the fluid,
   a fluid outlet (30) with a discharge valve (31), which is adjustable between an open position, for the discharge of the fluid out of the reaction chamber (2), and a closed position, for stopping the discharge of the fluid out of the reaction chamber (2),
   an oxygen sensor (33) for detecting an oxygen content in the reaction chamber (2),
   a control device which is configured to control the feed valve (21) and the discharge valve (31) on the basis of the oxygen content detected by the oxygen sensor (33), such that the reaction chamber (2) is flushed via the feed and discharge valves (21, 31) situated in the open position, and at least the discharge valve (31) switches from the open position into the closed position as soon as a predetermined oxygen content is undershot,
   further comprising a pressurized-air valve (40) for raising the reaction chamber (2) relative to the pressure vessel (1) by means of pressurized air fed into the pressure vessel (1) via the pressurized-air valve (40), wherein the control device is furthermore configured to automatically actuate the pressurized-air valve (40) in order to raise the reaction chamber (2) on the basis of an operating parameter detected by the control device.

2. Pressure vessel (1) according to claim 1, wherein the control device is configured to control the feed valve (21) such that, after the switch of the discharge valve (31) into the closed position, the feed valve (21) remains in the open position, such that the reaction chamber (2) is pressurized by means of the fluid fed via the feed valve (21).

3. Pressure vessel (1) according to claim 1, wherein the feed valve (21) and the discharge valve (31) are provided above the samples (P) accommodated in the pressure vessel (1).

4. Pressure vessel (1) according to claim 1, further comprising a feed line (22) which is connected to the feed valve (21) and to the fluid inlet (20) and which serves for feeding the fluid into the reaction chamber (2).

5. Pressure vessel (1) according to claim 4, wherein the feed line (22) opens into the fluid inlet (20) from outside the pressure vessel (1).

6. Pressure vessel (1) according to claim 1, wherein the operating parameter is an end of a reaction.

7. Pressure vessel (1) according to claim 1 further comprising a check valve (23) which is configured to stop the feed of the fluid via the feed valve (21) into the reaction chamber (2) as soon as a particular pressure is reached in the reaction chamber (2).

8. Pressure vessel (1) according to claim 1, further comprising a discharge line (32) which is connected to the fluid outlet (30) and to the discharge valve (31) and which serves for discharging oxygen from the reaction chamber (2).

9. Pressure vessel (1) according to claim 8, wherein the oxygen sensor (33) for detecting the oxygen content is connected to the discharge line (32) downstream of the discharge valve (31).

10. Pressure vessel (1) according to claim 8, wherein the discharge line (32) opens into the fluid outlet (30) from outside the pressure vessel (1).

11. Method for flushing the reaction chamber of the pressure vessel (1) according to claim 1, comprising the following steps:
    flushing the reaction chamber (2) via the fluid inlet (20) and the fluid outlet (30) and the open feed and discharge valves (21, 31) by means of the fluid,
    detecting the oxygen content in the reaction chamber with the oxygen sensor (33), and
    closing at least the discharge valve (31) as soon as the detected oxygen content
    undershoots the predetermined oxygen content.

12. Method according to claim 11, wherein the fluid is a flushing gas.

13. Method according to claim 11, wherein the fluid is a reductive gas.

14. Method according to claim 11, wherein the fluid is an inert gas.

15. Method according to claim 11, wherein the fluid has argon and/or hydrogen.

16. Method according to claim 11, wherein the fluid has 5 vol. % hydrogen.

* * * * *